United States Patent
Takahashi et al.

(10) Patent No.: US 6,335,109 B1
(45) Date of Patent: Jan. 1, 2002

(54) SAFETY DEVICE AND SECONDARY BATTERY USING THE SAME

(75) Inventors: Akihiko Takahashi; Shinichi Takemura; Yasuhiro Goto, all of Gamo-gun; Chitoshi Ueki, Kokubu, all of (JP)

(73) Assignee: Kyocera Corporation, Koto (JP)

(*) Notice: Subject to any disclaimer, the term of this patent is extended or adjusted under 35 U.S.C. 154(b) by 0 days.

(21) Appl. No.: 09/299,583

(22) Filed: Apr. 27, 1999

(30) Foreign Application Priority Data

Apr. 28, 1998 (JP) .......................... 10-119756
Nov. 27, 1998 (JP) .......................... 10-337226

(51) Int. Cl.$^7$ .................. H01M 2/34; H01M 10/52; H01H 35/24
(52) U.S. Cl. .................. 429/7; 429/57; 429/59; 429/61; 200/61.08
(58) Field of Search .................. 429/58, 59, 61, 429/7, 53, 56, 57; 200/61.08

(56) References Cited

U.S. PATENT DOCUMENTS

| | | | |
|---|---|---|---|
| 4,757,414 A | 7/1988 | Barker et al. ................ | 361/15 |
| 5,705,290 A | * 1/1998 | Azema ........................ | 429/53 |
| 6,120,928 A | * 9/2000 | Azema ........................ | 429/91 |

FOREIGN PATENT DOCUMENTS

| | | |
|---|---|---|
| DE | 24 36 443 | 2/1976 |
| DE | 3151469 A1 | 7/1983 |
| DE | 44 11 289 A1 | 10/1995 |
| DE | 19524 79 A1 | 2/1996 |
| EP | 0 674 351 A | 9/1995 |
| EP | 0 818 866 A | 1/1998 |
| JP | 7 105932 | 4/1995 |
| JP | 7/335274 | 12/1995 |
| JP | 09-55197 | 2/1997 |
| JP | 9/329507 | 12/1997 |

* cited by examiner

Primary Examiner—Gabrielle Brouillette
Assistant Examiner—Jonathan Crepeau
(74) Attorney, Agent, or Firm—Rabin & Berdo, P.C.

(57) ABSTRACT

A safety device having a thin plate of a brittle material adapted to be ruptured by a difference between pressures exerted on opposite sides thereof; and a conductive path provided on the thin plate and adapted to be cut off by the rupture of the thin plate. One surface of the thin plate is present in a reference pressure chamber. The safety device with its reference pressure chamber being sealed is incorporated in a secondary battery. When the secondary battery is overcharged, the pressure difference between the opposite sides of the thin plate is increased, so that the thin plate is ruptured to cut off the conductive path.

12 Claims, 7 Drawing Sheets

F I G. 5A
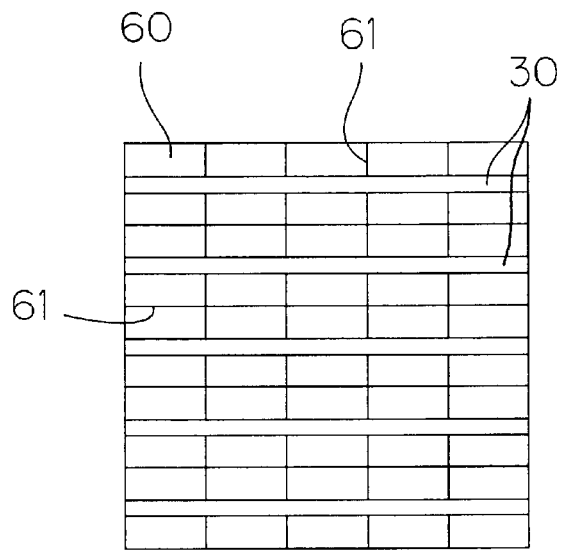
TURNOVER
F I G. 5B
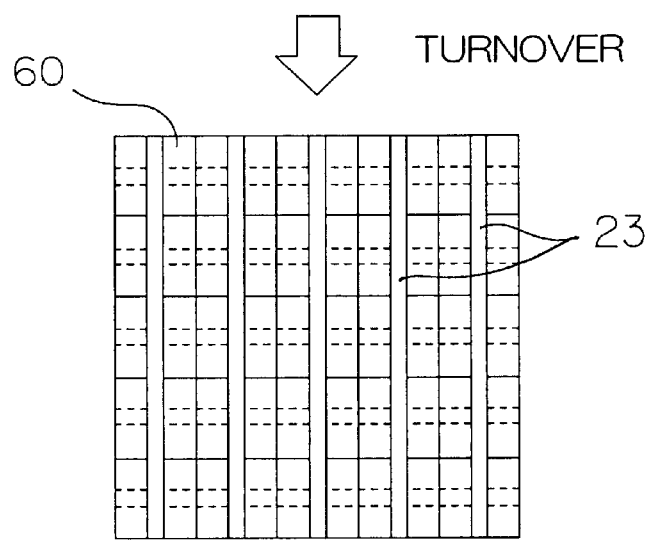
TURNOVER
F I G. 5C
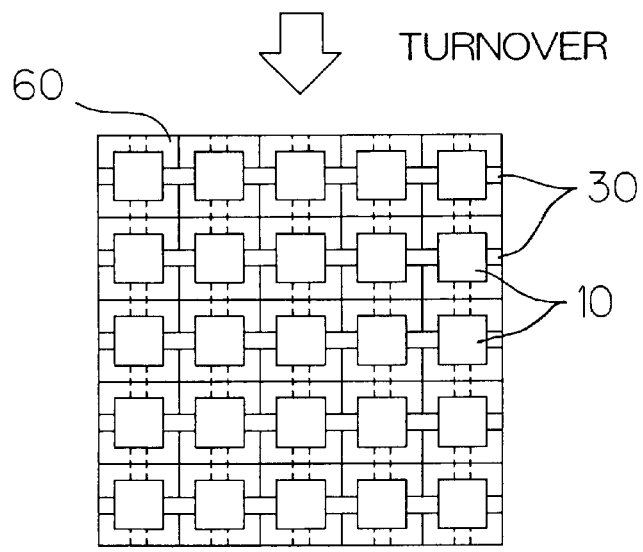

SAFETY DEVICE AND SECONDARY BATTERY USING THE SAME

BACKGROUND OF THE INVENTION

1. Field of the Invention

The present invention relates to a safety device for maintaining the safety of an apparatus by cutting off a current flow path in response to pressure buildup inside the apparatus. Particularly, the invention relates to a safety device for use in smaller size apparatuses such as rechargeable secondary batteries, typically lithium ion batteries, with an imperative need for size reduction. Further, the invention relates to a secondary battery using such a safety device.

2. Description of Related Art

With the spread of portable information systems such as portable phones, video cameras and notebook personal computers, high performance rechargeable secondary batteries such as lithium ion batteries have come into widespread use.

FIG. 9 is a schematic diagram illustrating the basic construction of a conventional lithium ion battery. The lithium ion battery has such a simple construction that a positive electrode 90 and a negative electrode 100 are disposed in an electrolytic solution 70 of an organic solvent with a separator 80 interposed therebetween. Migration of Li ions between the positive electrode 90 and the negative electrode 100 causes the battery to be charged and discharged. Lithium oxide is employed for the positive electrode 90, and a carbon compound is employed for the negative electrode 100.

The secondary battery offers high performance. However, when the battery is overcharged or short-circuited, a gas evolves due to decomposition of the electrolytic solution thereby to increase the inside pressure of the battery. In the worst case, this results in explosion of the battery. Therefore, batteries of this type are provided with various types of safety devices.

The safety devices are generally classified into two types, i.e., safety valve mechanisms and current flow interruption mechanisms. The safety valve mechanisms are designed such that a safety valve provided in a battery surface is opened by buildup of the battery inside pressure thereby to release the inside gas for prevention of further increase in the inside pressure. On the other hand, the current flow interruption mechanisms are adapted to cut off a conductive path by utilizing the buildup of the inside gas pressure or to cut off a conductive path in response to detection of a temperature rise caused by the pressure build-up inside the battery.

As a current flow interruption mechanism responsive to a temperature rise, a simple mechanism employing a positive temperature coefficient (PTC) element as a thermosensitive element has been put to practical use. However, there is a time lag between the buildup of the battery inside pressure and the temperature rise. Therefore, such a mechanism fails to ensure a stable operation, making it difficult to provide a highly reliable safety device.

A current flow interruption mechanism responsive to the buildup of the gas pressure inside a battery is disclosed, for example, in Japanese Unexamined Patent Publication (KOKAI) No. 9-55197 (1997). In accordance with this art, the mechanism includes a pressure-responsive displacement member adapted to be displaced by the increase in the battery inside pressure, and is designed so that a conductive path is cut off by the displacement of the pressure-responsive displacement member.

In this art, the conductive path, the pressure-responsive displacement member and a support member for supporting these components are required. Therefore, the mechanism has a complicated construction, presenting problems associated with the size reduction and cost reduction.

In recent years, the portable information systems have been remarkably downsized, and further size reduction thereof will inevitably be in demand. Therefore, the size reduction of the batteries to be incorporated in such portable information systems is imperative. Since a safety device including any of the aforesaid complicated mechanisms of the prior art has a relatively large size, it is very difficult to embody a smaller size battery with such a safety device.

SUMMARY OF THE INVENTION

It is a first object of the present invention to provide a safety device which has an easily downsizable construction.

It is a second object of the present invention to provide a safety device which can readily be incorporated in a battery.

It is a third object of the present invention to provide a highly reliable secondary battery provided with a safety device.

It is a fourth object of the present invention to provide an advantageous fabrication method for a highly reliable safety device.

The safety device according to the present invention includes a thin plate of a brittle material adapted to be ruptured by a difference between pressures exerted on opposite sides thereof, and a conductive path provided on the thin plate and adapted to be cut off by the rupture of the thin plate.

The thin plate may be provided integrally with a peripheral greater thickness portion.

One surface of the thin plate is preferably present in a reference pressure chamber. In this case, when a greater (or smaller) pressure is exerted on the other surface of the thin plate, the thin plate is ruptured, thereby cutting off the conductive path. Thus, the safety device is of a pressure-responsive type which is effectuated when the pressure is out of a predetermined allowable range.

More specifically, the safety device of the pressure-responsive type is preferably embodied such that the reference pressure chamber is defined by a partition wall partly constituted by the thin plate. In this case, the reference pressure chamber is preferably sealed.

The safety device may otherwise be constructed such that the reference pressure chamber is defined by a plate member having a cavity and a cover member which covers the cavity, and the cover member or a bottom of the cavity is comprised of the thin plate.

The safety device may otherwise be constructed such that the reference pressure chamber is partly defined by a spacer plate provided integrally with the thin plate on the one surface thereof and having a through-hole through which a portion of the one surface of the thin plate is exposed.

In this case, a juncture between the spacer plate and the thin plate preferably has an inner corner having a curvature radius of not greater than 0.1 mm. Thus, when the pressure difference between the opposite sides of the thin plate reaches a predetermined level, the rupture of the thin plate can instantaneously and assuredly be caused. Hence, the safety device is highly reliable.

Further, the reference pressure chamber is preferably sealed by a cover plate provided on a side of the spacer plate opposite from the thin plate as covering the spacer plate.

The reference pressure chamber preferably has a major- to minor-axis length ratio of 1.0 to 1.2 as viewed in plan. This ensures the rupture of the thin plate when the pressure difference between the opposite sides thereof reaches the predetermined level.

The brittle material may be selected from the group consisting of ceramic materials, glass materials and glass ceramic materials.

The brittle material preferably has a Young's modulus of not lower than 60GPa and a flexural strength of 80 to 100 MPa.

The thin plate preferably has a thickness of 10 to 100 μm. Thus, the thin plate is easy to handle in production thereof, and has stable rupture characteristics.

For more stable rupture characteristics of the thin plate, the thin plate preferably has a thickness of 25 to 75 μm.

The secondary battery according to the present invention includes the aforesaid safety device which is interposed between an internal electrode and an external electrode in a battery casing.

Since the safety device has a small and simple construction, it is easy to incorporate the safety device in the battery. Thus, the secondary battery with the safety device is highly reliable with a smaller size.

The thin plate, if composed of a ceramic material, is virtually free from time-related changes, so that operational variations of the safety device can be suppressed for an extended period without provision of a special protective film on the thin plate.

The fabrication method for the safety device according to the present invention includes the steps of: forming a green sheet for a thin plate from a brittle material; forming a green sheet for a spacer plate having a hole which later serves as a reference pressure chamber; and combining the thin plate green sheet with the spacer plate green sheet into a laminate and integrally sintering the laminate.

In accordance with the present invention, the curvature radius of a corner of a juncture between the thin plate and the spacer plate can be reduced, and the safety device can be fabricated at lower costs.

In accordance with one embodiment of the present invention, the fabrication method further includes the step of forming a green sheet for a cover plate. In the combining and sintering step, the spacer plate green sheet is combined with the thin plate green sheet and the cover plate green sheet as being held therebetween and the three combined sheets are integrally sintered.

The fabrication method preferably further includes the steps of forming a through-hole in a portion of the cover plate which opposes to the reference pressure chamber and, after the sintering step, closing the through-hole.

The foregoing and other objects, features and effects of the present invention will become more apparent from the following description of the preferred embodiments with reference to the attached drawings.

BRIEF DESCRIPTION OF THE DRAWINGS

FIGS. 5A, 5B and 5C are diagrams illustrating a fabrication process for the safety device of the third embodiment;

DESCRIPTION OF THE PREFERRED EMBODIMENTS

Figures 1A, 1B:
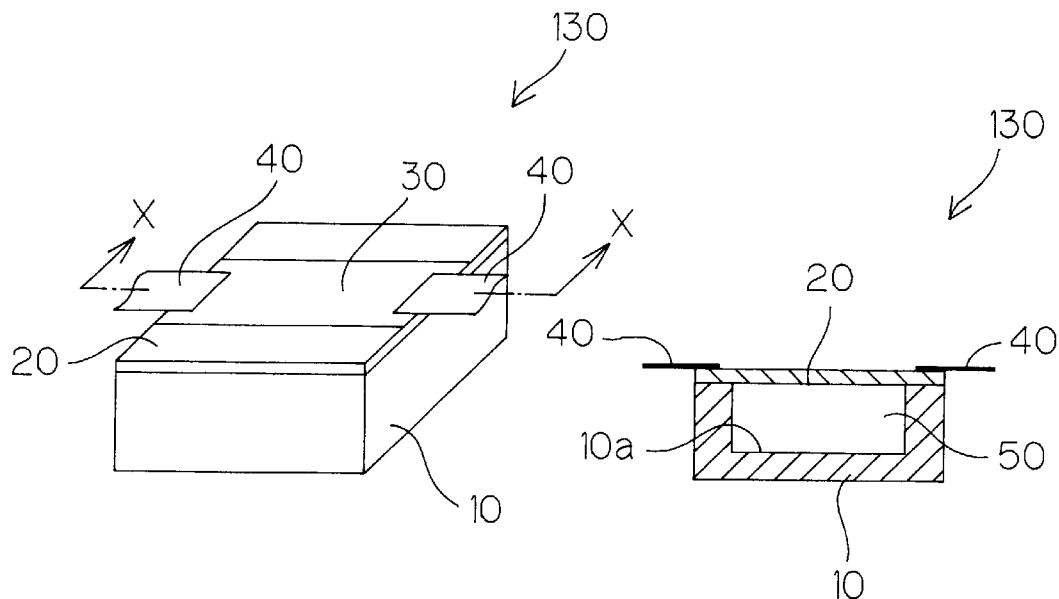
FIG. 1A is a perspective view illustrating the construction of a safety device according to a first embodiment of the present invention.
FIG. 1B is a sectional view taken along a line X—X in FIG. 1A.

FIGS. 1A and 1B are a perspective view and a sectional view, respectively, which illustrate a safety device according to one embodiment of the present invention. The safety device 130 includes a container 10 having a recess formed in the center thereof and a thin plate 20 as a cover member which sealingly covers the mouth of the container 10. The thin plate 20 is composed of a brittle material and adapted to be ruptured when a difference between pressures exerted on opposite sides of the thin plate 20 exceeds a predetermined level. The thin plate 20 is bonded to the container 10, for example, with an adhesive.

Examples of specific brittle materials include ceramic materials, glass materials and glass ceramic materials.

The container 10 is not necessarily required to be composed of a ceramic material, but preferably composed of the same material as the thorn plate 20 for stable attachment of the thin plate 20 to the container 10. Where the thin plate 20 and the container 10 are composed of the same ceramic material, it is also possible to fix the thin plate 20 to the container 10 in a ceramic sintering process.

In the safety device 130, a sealed reference pressure chamber 50 is formed by covering the recess 10a of the container 10 with the thin plate 20. Thus, one surface of the thin plate 20 is present in the reference pressure chamber 50 so as to be subjected to the inside pressure (e.g., atmospheric pressure) of the reference pressure chamber 50. A conductive path 30 is formed on the other surface of the thin plate 20 not facing to the reference pressure chamber 50 by a thick film printing technique. A pair of electrodes 40 are brazed to opposite edges of the thin plate 20.

Figure 2:
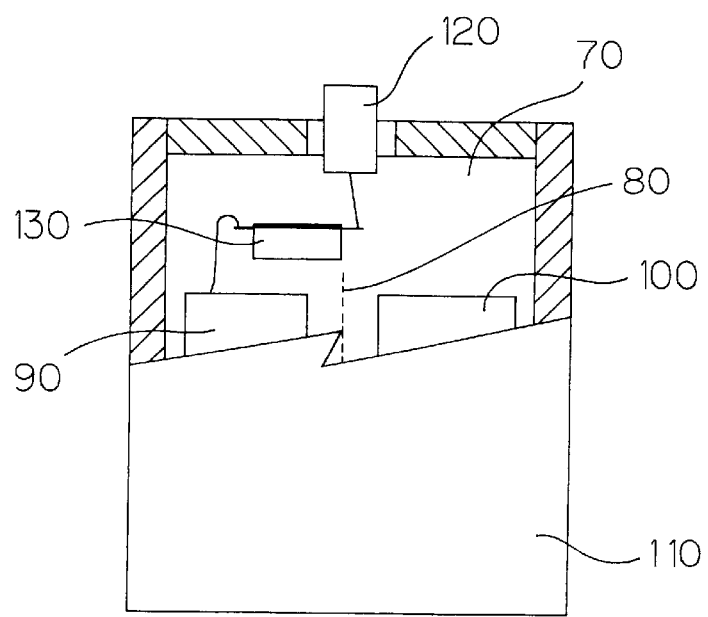
FIG. 2 is a partially broken side view schematically illustrating the construction of a secondary battery which employs the safety device of the present invention.

FIG. 2 illustrates a secondary battery in which the safety device 130 shown in FIGS. 1A and 1B is incorporated. A casing 110 is filled with an electrolytic solution 70, in which a positive electrode 90 and a negative electrode 100 as internal electrodes are immersed with a separator 80 interposed therebetween. Although the positive electrode 90 and the negative electrode 100 are actually of a plural-layer structure with the separator 80 interposed therebetween, these electrodes are schematically illustrated in FIG. 2.

The positive electrode 90 is connected via the safety device 130 to an output portion 120 as an external electrode led out of the casing 110. The negative electrode 100 is electrically connected to the casing 110 via an interconnection not shown.

The safety device 130 is provided between the output portion 120 and the positive electrode 90 in the electrolytic solution 70 within the casing 110. The electrodes 40 connected to opposite ends of the conductive path 30 formed on the thin plate 20 of the safety device 130 are respectively connected to the output portion 120 and the positive electrode 90.

In the embodiment shown in FIG. 2, the safety device 130 is connected to the positive electrode 90, but may be connected to the negative electrode 100.

If the secondary battery of such a construction is overcharged for some reason, a gas evolves inside the battery, thereby increasing the inside pressure. When the battery inside pressure reaches a certain level, the pressure difference between the opposite sides of the thin plate 20 exceeds the predetermined level, so that the thin plate 20 is ruptured. Thus, the conductive path 30 formed on the thin plate 20 is cut off to interrupt the charging process. The interruption of the charging process ceases the evolution of the gas inside the battery, thereby preventing further pressure increase.

The thin plate 20, which is composed of the brittle material, is assuredly ruptured without elastic deformation thereby to cut off the conductive path 30 when the pressure difference between the opposite sides thereof reaches the predetermined level.

The thickness and material of the thin plate 20 may properly be determined or selected depending on the inside pressure level at which the conductive path is to be cut off and the allowable size of the safety device 130.

The following is a specific example of the safety device 130 shown in FIGS. 1A and 1B.

The container 10 herein employed was a 5-mm square and 3-mm thick rectangular container having a 4-mm square and 2-mm deep recess therein. The thin plate 20 had a thickness of 0.1 mm. The container 10 and the thin plate 20 were each formed of an alumina-based ceramic material. The conductive path 30 was formed of Cu by the thick film printing method.

The thin plate 20 was sealingly bonded to the container 10 with an epoxy adhesive, and a cavity defined therein was at a normal pressure.

For a rupture test, 100 safety devices each having such a construction were prepared. An air pressure was externally applied to each of the safety devices, and rupture conditions of the thin plate 20 were recorded when the thin plate 20 was ruptured. The test results are shown in Table 1. The safety devices were all ruptured in a pressure range between 6 and 8 kg/cm$^2$, which satisfied a required rupture pressure level. Further, it was confirmed that the conductive path 30 was assuredly cut off in each of the safety devices.

TABLE 1

| External pressure (kg/cm$^2$) | –6 | 6–6.5 | 6.5–7 | 7–7.5 | 7.5–8 | 8– |
|---|---|---|---|---|---|---|
| Number of ruptured devices | 0 | 8 | 31 | 50 | 11 | 0 |

The container and the cavity each had a rectangular configuration in this specific example, but may have any other configurations, as long as the thin plate is so dimensioned as to be ruptured at a required pressure level.

Figure 3:
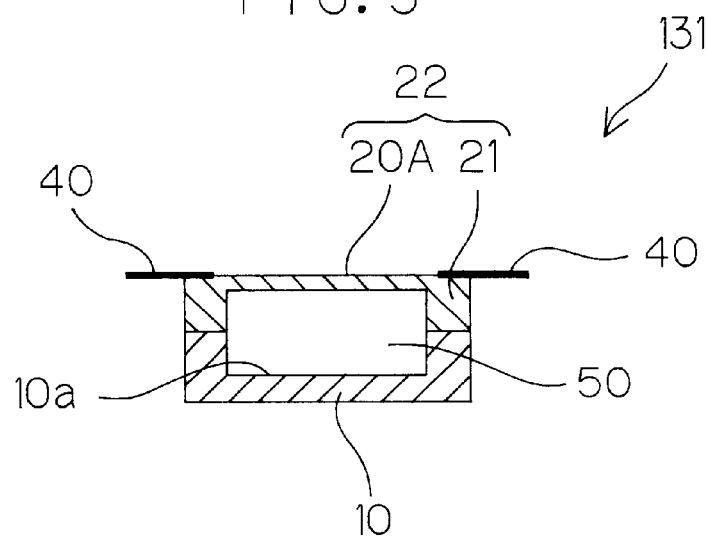
FIG. 3 is a sectional view illustrating the construction of a safety device according to a second embodiment of the present invention.

FIG. 3 is a sectional view illustrating the construction of a safety device 131 according to a second embodiment of the present invention. The safety device 131 can be used instead of the safety device 130 in the secondary battery shown in FIG. 2. In FIG. 3, components corresponding to those shown in FIG. 1 are denoted by the same reference numerals as in FIG. 1.

In the fabrication of the safety device 130 according to the first embodiment, it is necessary to handle the thin plate 20 which has a very small thickness. Where the thin plate 20 is composed of a ceramic material, for example, the thickness thereof is about 0.1 mm or smaller. Such a thin ceramic plate may be cracked even only by holding it with tweezers and, therefore, is difficult to handle in the fabrication process.

In the case of the safety device 131 shown in FIG. 3, a cover member 22 is employed which has a thin plate portion 20A and a peripheral greater thickness portion 21 integrally formed with the thin plate portion 20A. More specifically, the safety device 131 is constructed such that a container 10 having a recess 10a in the center thereof is covered with the cover member 22 to define a sealed reference pressure chamber 50 therein.

With this arrangement, the cover member 22 is free from cracking in the fabrication process, because the cover member 22 can be handled by holding the greater thickness portion 21 thereof. When the pressure difference between opposite sides of the thin plate portion 20A of the cover member 22, the thin plate portion 20A is assuredly ruptured. Thus, the safety device 131 is highly reliable as in the first embodiment.

Figure 4:
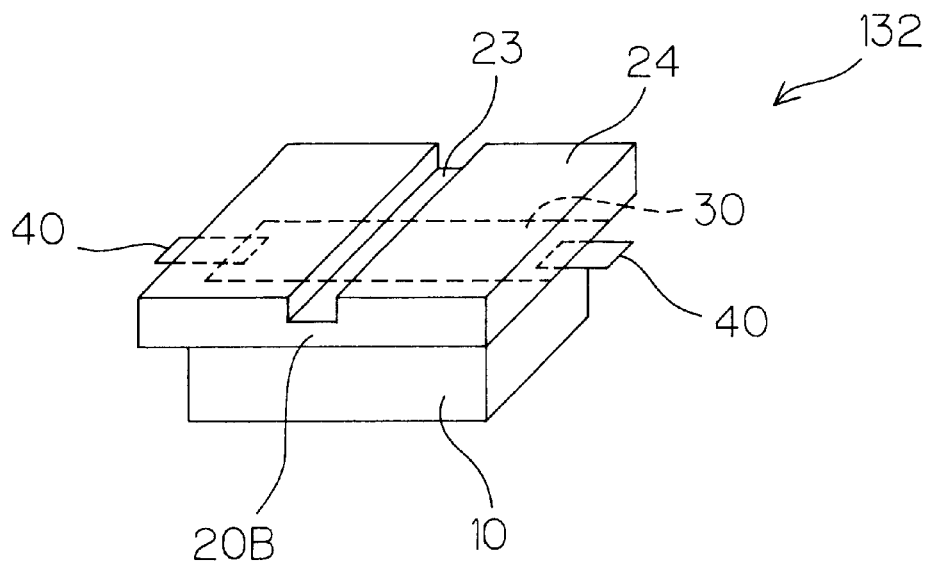
FIG. 4 is a perspective view illustrating the construction of a safety device according to a third embodiment of the present invention.

FIG. 4 is a perspective view illustrating the construction of a safety device 132 according to a third embodiment of the present invention. The safety device 132 can be employed instead of the safety device 130 in the secondary battery shown in FIG. 2. In FIG. 4, components corresponding to those shown in FIG. 1 are denoted by the same reference numerals as in FIG. 1.

In this embodiment, the safety device 132 is constructed such that the mouth of a container 10 having a recess 10a is covered with a substrate 24 which has a greater thickness than the thin plate 20 to define a reference pressure chamber 50 therein. A groove 23 having a flat bottom face is provided in a surface of the substrate 24 opposite from the reference pressure chamber 50, and a portion of the substrate 24 under the groove serves as a thin plate portion 20B. The thickness of the thin plate portion 20B can accurately be set by properly selecting a working method. The thin plate portion 20B is adapted to be ruptured when a pressure difference between opposite sides thereof reaches a predetermined level.

A conductive path 30 is formed on a surface of the thin plate portion 20B facing to the reference pressure chamber (or opposite from the groove 23), and adapted to be cut off when the thin plate portion 20B is ruptured. The substrate 24 has a rectangular configuration of a size slightly greater than the container 10 as viewed in plan. The electrodes 40 are brazed to the conductive path 30 on portions of the substrate 24 projecting outside the container 10.

FIGS. 5A, 5B and 5C are diagrams schematically illustrating a fabrication process for the safety device 132 of this embodiment. First, a substrate 60 having split grooves 61 formed in one surface thereof is prepared, which is to be split along the grooves 61 into a plurality of substrate pieces. The thickness of the substrate 60 is greater than the thickness of the thin plate portion 20B, which is adapted to be ruptured for cut-off of the conductive path 30. A plurality of conductive paths 30 for a plurality of safety devices 132 are formed on the substrate 60 by a printing process or the like (FIG. 5A). In turn, the substrate 60 is turned over, and a plurality of grooves 23 are formed on the other surface of the substrate 60 as extending perpendicularly to the conductive paths 30 by a laser machining process or a sand-blast process for formation of thin plate portions 20B (FIG. 5B). The substrate 60 is turned over again, and a plurality of containers 10 each having a recess 10a in the center thereof are bonded onto the surface of the substrate 60 formed with the conductive paths 30 with an adhesive or the like (FIG. 5C). Thereafter, the substrate 60 is split along the split grooves 61 to provide the plurality of safety devices 132 each having the construction shown in FIG. 4.

In this fabrication process, the printing process for the formation of the conductive paths 30 and the groove forming process for formation of the thin plate portions 20B can be performed in a batch for fabrication of the plurality of safety devices 132. Therefore, the safety devices 132 can efficiently be mass-produced.

Although the step of attaching the electrodes 40 to the conductive paths is not shown in FIGS. 5A to 5C, the electrode attaching step can also easily be adapted for the mass production. For example, the substrate 60 shown in FIG. 5C is split into a plurality of elongate substrate strips extending along the conductive paths 30 in the substrate splitting process, and the electrodes 40 are attached to the conductive paths of each of the elongate substrate strips for plural safety devices. Then, the electrodes 40 and the substrate strips are further split. Accordingly, there is no need to handle the electrodes 40 on a one-by-one basis, thereby facilitating the fabrication process. The brazing process can effectively be performed, since the plurality of electrodes 40 can be brazed to the conductive paths at a time.

The following is a specific example of the fabrication process for the safety device 132 shown in FIGS. 5A to 5C.

A 0.3-mm thick alumina-based ceramic plate, which was formed with split slits and relatively easy to handle, was employed as the splittable substrate 60. Conductive portions 30 for a plurality of safety devices 132 were formed of Cu on one surface of the substrate 60 by a thick film printing process. Grooves 23 each having a width of about 1 mm and a depth of 0.25 mm were formed on the other surface of the substrate 60 as extending perpendicularly to the conductive portions 30 by a laser machining process. Thereafter, containers 10 separately prepared were bonded, onto the surface of the substrate 60 not formed with the grooves 23, with an epoxy adhesive. Then, the substrate 60 was split along the split slits for provision of the individual devices. This fabrication process allowed for easy mass production of the very small size devices.

Figure 6A:
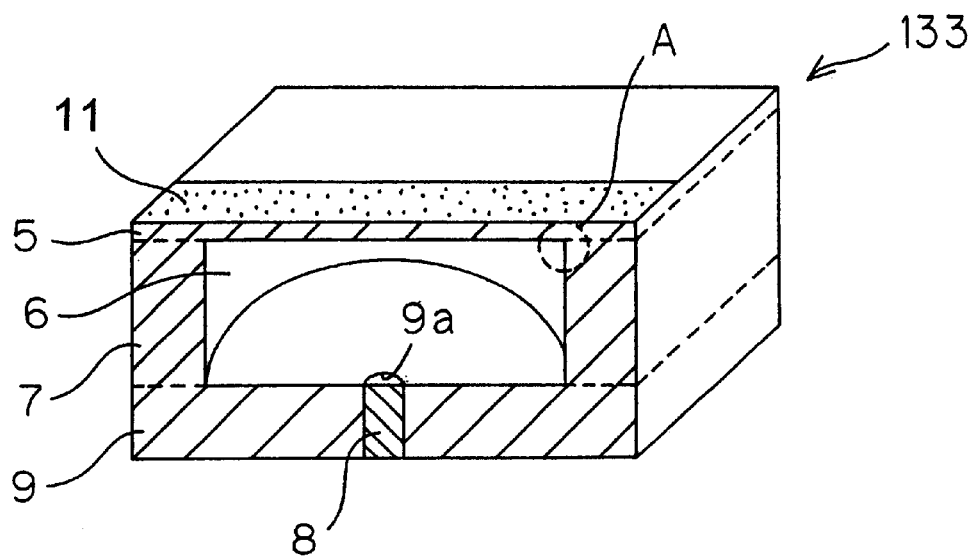
FIG. 6A is a partially broken perspective view illustrating a safety device according to a fourth embodiment of the present invention.
Figure 6B:
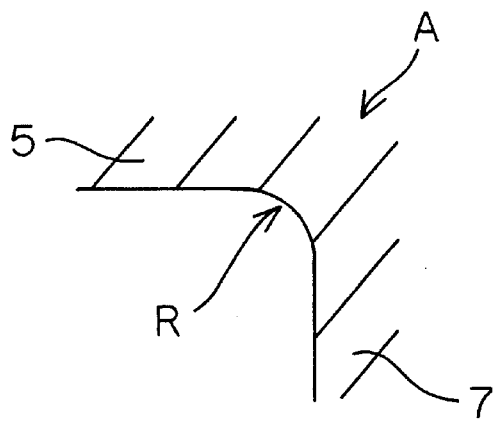
FIGS. 6B and 6C are sectional views illustrating a portion of the safety device indicated at A in FIG. 6A.

FIG. 6A is a partially broken perspective view illustrating a safety device 133 of a fourth embodiment of the present invention. A spacer plate 7 is provided integrally with a thin plate 5 on one surface thereof. The thin plate 5 is composed of a brittle material such as a ceramic material, a glass material or a glass ceramic material. The spacer plate 7 is a hollow cylindrical member which has a hollow central portion serving as a reference pressure chamber 6 and is connected to the peripheral edge of the thin plate 5. A cover plate 9 is provided integrally with the spacer plate 7 on a side thereof opposite from the thin plate 5 as covering the reference pressure chamber 6. The cover plate 9 is formed with a through-hole 9a, which is closed with a filler 8. A conductive path 11 is formed on the other surface (exposed surface) of the thin plate 5 by a vapor deposition process.

The safety device 133 can be employed instead of the safety device 130 in the secondary battery shown in FIG. 2. When a greater pressure is exerted on the surface of the thin plate 5 opposite from the reference pressure chamber 6 due to overcharging or the like so that a pressure difference between the opposite sides of the thin plate 5 reaches an abnormal level greater than a predetermined level, the thin plate 5 is ruptured to cut off the conductive path 11 for interruption of the charging of the secondary battery from a main power source. Since the thin plate 5 is formed of a brittle material such as a ceramic material, a glass material or a glass ceramic material, the thin plate 5 can assuredly be ruptured without elastic deformation to cut off the conductive path 11.

Figure 6C:
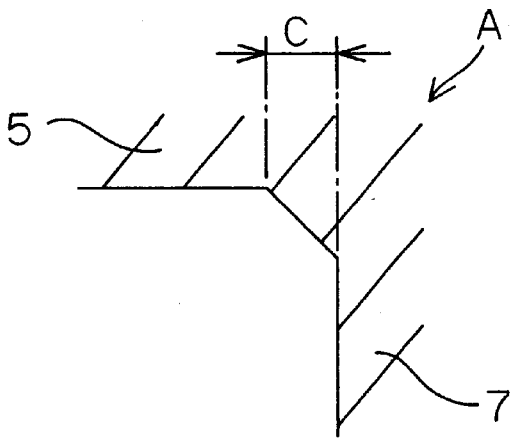

In this safety device 133, a juncture between the spacer plate 7 and the thin plate 5 has a corner A (inner corner facing to the reference pressure chamber 6) having a radius of curvature R of not greater than 0.1 mm, so that the thin plate 5 can assuredly be ruptured at an abnormal pressure. Thus, when an abnormal pressure occurs, cracking of the thin plate starts from the juncture corner A for the assured rupture of the thin plate 5.

Where the juncture corner is not a round corner but a flat face corner as indicated in FIG. 6C, the breadth C of a flat face is herein defined as the radius of curvature. Such definition is applied to any other configuration of the juncture corner.

Where the formation of the reference pressure chamber 6 is to be achieved by a press forming process or a cutting process in the fabrication process for this safety device, it is impossible to make the curvature radius R of the juncture corner A not greater than 0.1 mm, so that the rupture of the thin plate 5 at an abnormal pressure cannot be ensured. In a fabrication method to be described later, the safety device 133 is fabricated by stacking green sheets one on another, so that the radius of curvature R of the juncture corner A can be made not greater than 0.1 mm.

In the present invention, the reference pressure chamber 6 preferably has such a plan configuration that the major- to minor-axis length ratio thereof is in a range between 1.0 and 1.2. Thus, the conductive path 10 can instantaneously and completely be cut off when abnormal pressure occurs. The terms "major axis length" and "minor axis length" herein mean the greatest diameter and the smallest diameter, respectively, of the reference pressure chamber 6 as viewed in plan. Where the reference pressure chamber has a square configuration, the major axis length and the minor axis length are regarded as corresponding to the length of the diagonal thereof and the length of the side thereof, respectively. In such a case, the major- to minor-axis length ratio is about 1.4 and, hence, falls out of the preferred scope.

In the present invention, the material for the thin plate 5 to be ruptured has a Young's modulus of not lower than 60 GPa and a flexural strength of 70 to 1000 MPa, and the thickness of the thin plate 5 is 10 to 100 $\mu$m. Thus, the effectuation pressure of the safety device 33 (at which the thin plate 5 is to be ruptured) is properly adjusted, so that the instantaneous and complete cut-off of the conductive path 11 can be achieved when an abnormal pressure occurs.

Examples of specific materials for the thin plate 5 include ceramic materials such as alumina and zirconia, glass materials such as crystallized glass materials, and glass ceramic materials. The spacer plate 7 and the cover plate 9 are preferably composed of the same material as the thin plate 5.

Next, an explanation will be given to a fabrication method for the safety device 133 of this embodiment.

Figure 7:
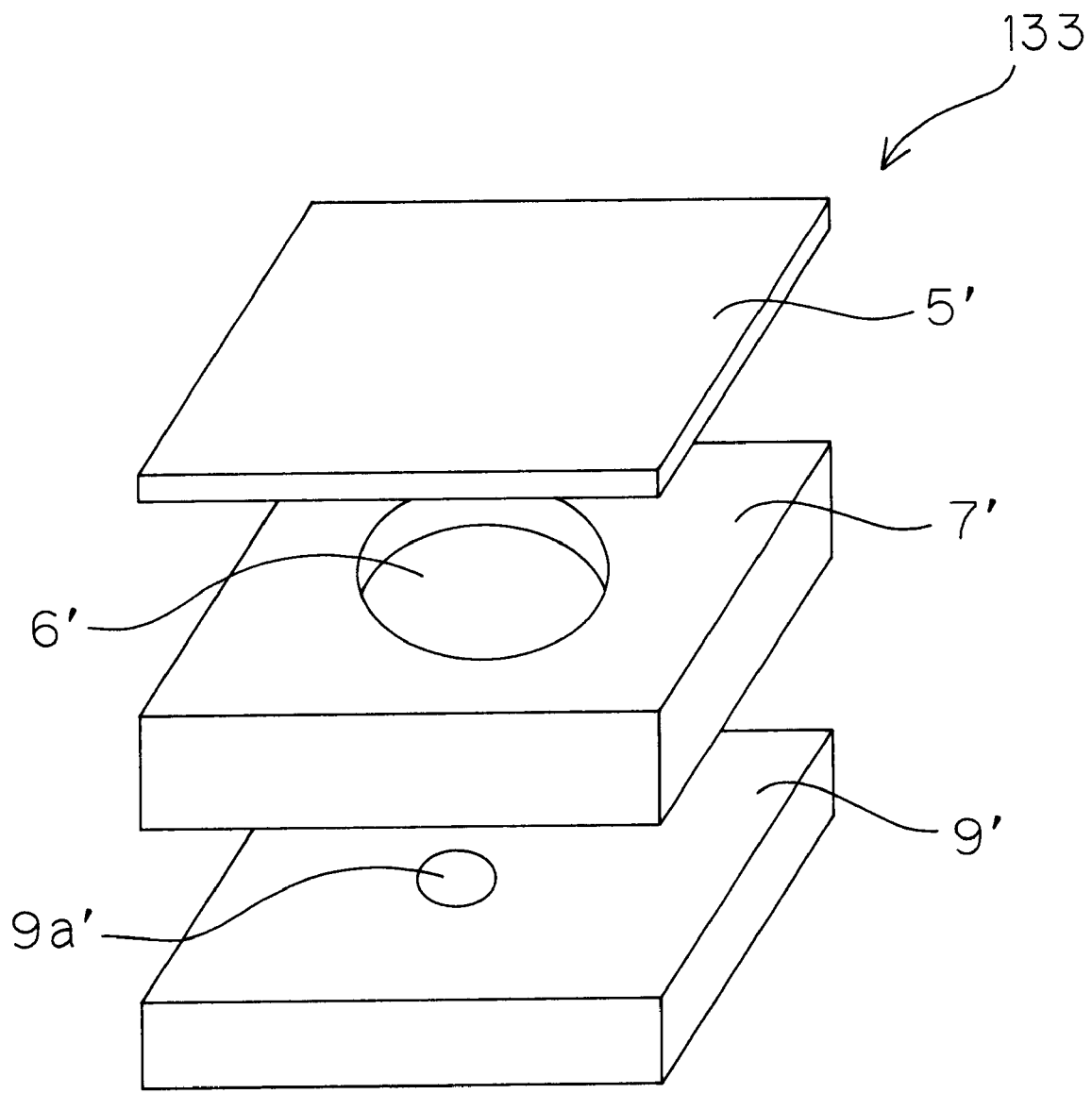
FIG. 7 is a perspective view for explaining a fabrication method for the safety device of the fourth embodiment.

A slurry is prepared by blending a powdery ceramic material such as alumina or zirconia, a powdery glass material or a powdery glass ceramic material with an organic binder, an plasticizer and a solvent. A thin green sheet 5' for preparation of the thin plate 5, a thick green sheet 7' for preparation of the spacer plate 7 and a green sheet 9' for preparation of the cover plate 9 as shown in FIG. 7 are formed from the resulting slurry by a doctor blade method, a calender roll method, a rolling method or a press method.

For the formation of the thin and thick green sheets, a water-soluble slurry may be employed, instead of the solvent-based slurry, which is prepared by blending a powdery ceramic material with an organic binder, a plasticizer, a dispersant and deionized water. The thick sheet may otherwise be prepared by combining a plurality of thin green sheets into a laminate.

The thick green sheet 7' is formed with a through-hole 6' which will later serve as the reference pressure chamber 6 and the green sheet 9' is formed with a minute through-hole 9a' by a stamping process using a metal stamping die. The thin green sheet 5', the thick green sheet 7' having the through-hole 6' and the thick green sheet 9' having the minute through-hole 9a' are stacked one on another to be combined into a laminate and, after a while, the resulting laminate is integrally sintered at a temperature of not lower than 800° C. in an atmospheric environment.

After the thin plate 5, the spacer plate 7 and the cover plate 9 are thus integrally sintered, the conducive path 11 is formed on the thin plate 5. Then, the through-hole 9a extending to the reference pressure chamber 6 is closed with a filler 8 such as of a resin. Thus, the safety device 133 of the present embodiment is obtained.

The through-hole 9a which is finally closed with the filler 8 serves to keep the reference pressure chamber 6 at an atmospheric pressure for prevention of breakage of the laminate during the fabrication process.

Another fabrication process is as follows. A powdery ceramic material such as alumina or zirconia, a glass material or a glass ceramic material is mixed with a binder, and green sheets for the spacer plate 7 and the thin plate 5 are formed from the resulting mixture by a press method. The sheets are stacked one on the other to be combined into a laminate, and integrally sintered at a temperature of not lower than 800° C. in an atmospheric environment. Then, the reference pressure chamber 6 is covered with the cover plate 9 and, after the thin plate 5 is processed to a desired thickness, the conductive path 11 is formed on the thin plate 5.

The conductive path 11 is formed of a metal such as Cu, Ni, Al, Au, Ag or Pd or an alloy thereof by a plating method, a sputtering method, a vapor deposition method or a printing method.

Figure 8:
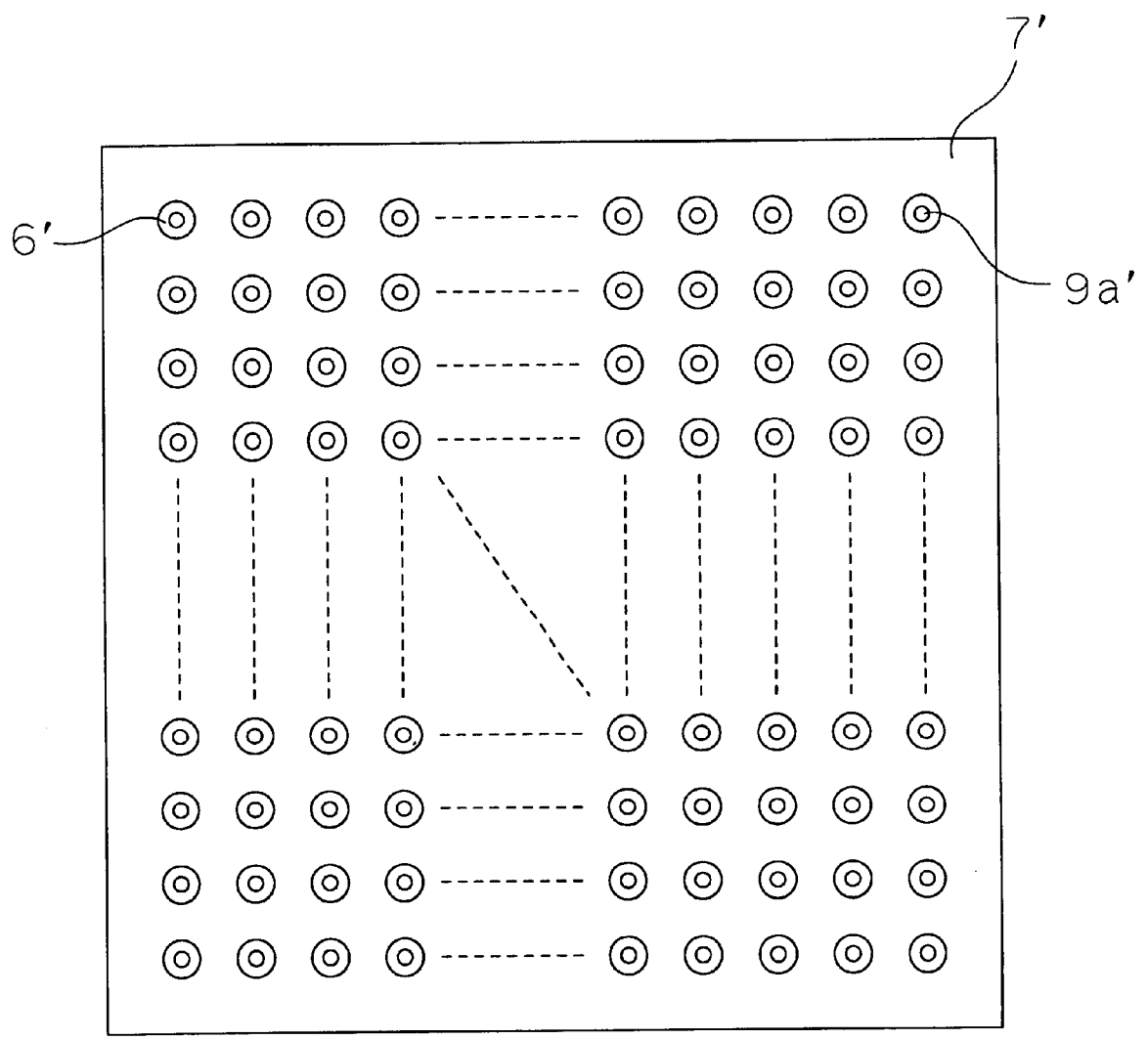
FIG. 8 is a plan view of green sheets to be employed in the fabrication of the safety device of the fourth embodiment.
Figure 9:
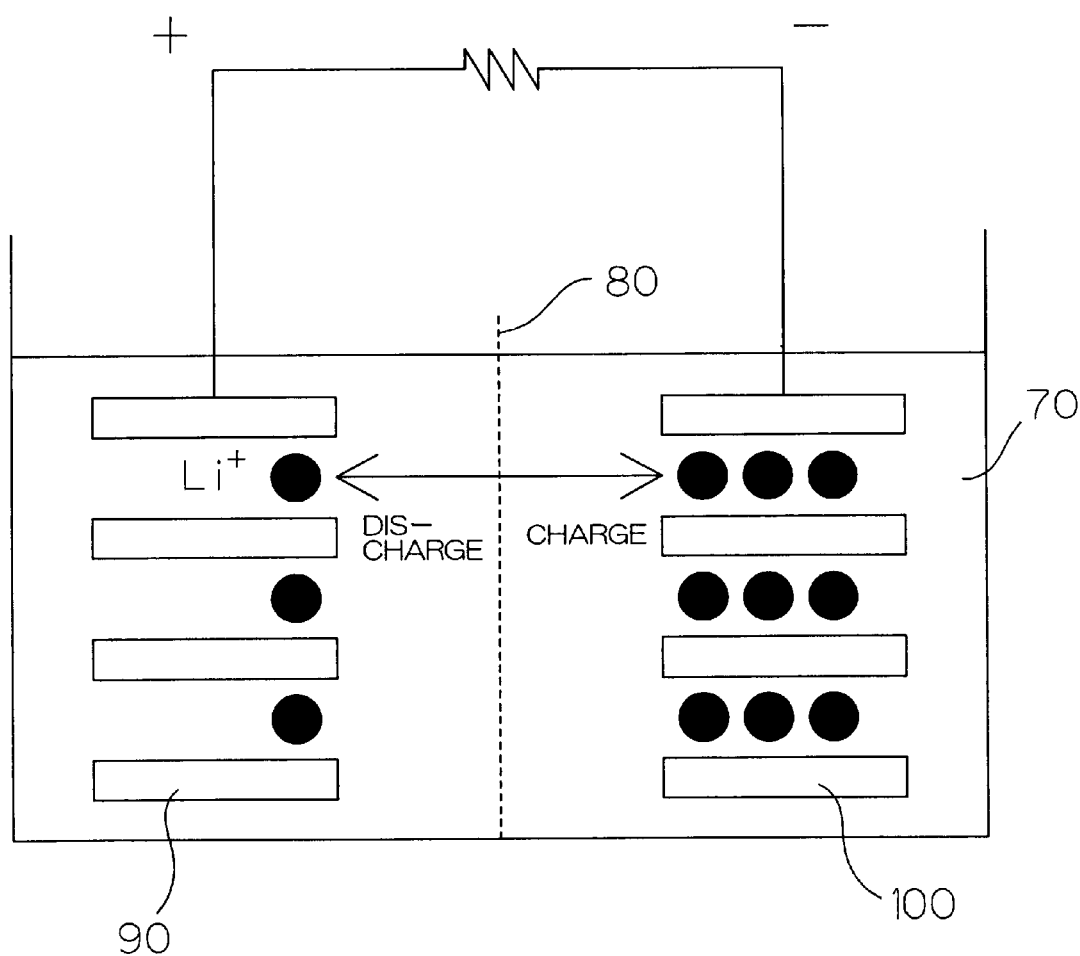
FIG. 9 is a schematic diagram illustrating the construction of a typical lithium ion battery.

The safety device 133 has a very small size, so that a multiplicity of such safety devices can be produced at a time by a multi-production method. As shown in FIG. 8, a multiplicity of through-holes 6' are formed in a single green sheet 7', which is then combined into a laminate with a green sheet 9' formed with a multiplicity of through-holes 9a' and a thin green sheet 5'. Then, the laminate is sintered. After formation of conduction paths 11, the resulting product is cut. Thus, the multiplicity of safety devices 133 are produced at a time.

In the fabrication process of this embodiment, the radius of curvature R of the corner A of the juncture between the thin plate 5 and the spacer plate 7 can be reduced to not greater than 0.1 mm by integrally sintering at least the green sheets for the thin plate 5 and the spacer plate 7 combined into a laminate. This allows for assured rupture of the thin plate 5 under an abnormal pressure.

Although the safety device of this embodiment is constructed such that the cover plate 9 is provided on one side of the thin plate 5 to define the sealed reference pressure chamber 6, the safety device may include only the thin plate 5 and the spacer plate 7 and be designed so that the thin plate 5 is ruptured by a pressure difference between the opposite sides of the thin plate 5 in another embodiment.

There will next be described a specific example of the fabrication process for the safety device 133 using alumina powder.

The alumina power was blended with an acrylic-ester-based binder, a plasticizer of hexylene glycol, a dispersant and deionized water for preparation of a water-soluble slurry. A thin alumina green sheet and thick alumina green sheets were prepared from the slurry by the calender roll method. The thick sheets were respectively stamped out with metal dies for formation of a through-hole 6' which will later serve as the reference pressure chamber 6 and a minute through-hole 9a' in the respective sheets. The metal dies herein used were configured so as to allow the through-holes 6' and 9' to have desired shapes after the sintering. The metal die for the stamping of the minute through-hole 9a' has a diameter of 0.3 mm.

Thereafter, the thin green sheet 5', the green sheet 7' having the through-hole 6' and the green sheet 9' having the minute through-hole 9a' were stacked one on another as shown in FIG. 7 to be combined into a laminate. The resulting laminate was thermocompress-bonded at 60° C. and 50 kgf/cm$^2$, and then sintered at 1570° C. in an atmospheric pressure environment. Thus, the safety device 133 was obtained.

As comparative examples, safety device samples were each fabricated by integrally press-molding a spacer plate portion and a thin plate portion with a mold by a known press molding method and then subjecting the thin plate portion to a thickness adjustment process. The molds used herein were designed so as to have different corner configurations which each corresponded to an inner corner of the juncture between the spacer plate portion and the thin plate portion.

Thus, safety device samples which had inner corners having different curvature radii R within a range between 0.01 to 0.20 mm at the juncture between the spacer plate 7 and the thin plate 5 were fabricated, and a relationship between the curvature radius of the juncture corner and the thin plate rupture ratio was examined. The thin plates 5 of the safety device samples each had a thickness of 50 μm.

The thin plate rupture ratio was determined in the following manner. The fabricated safety device samples were put in a pressure vessel, and the inside pressure of the vessel was gradually increased. The rupture ratio was calculated on the basis of the number of safety device samples in which the thin plate was ruptured until the pressure reached a maximum pressure of 7 kg/cm$^2$. The maximum pressure was set to a level corresponding to an inside pressure level of a secondary battery which was considered to be abnormal.

Further, safety device samples, which respectively included reference pressure chambers 6 having different plan configurations, were fabricated, and a relationship between the configuration of the reference pressure chamber and the thin plate rupture ratio was examined in the same manner as described above. The configurations of the reference pressure chambers herein employed were a circular configuration (major axis/minor axis =1.0), an oval configuration (major axis/minor axis =1.1, 1.2, 1.3, 1.4), a square configuration (major axis/minor axis =1.4), and a hexagonal configuration (major axis/minor axis =1.1, 1.2, 1.3, 1.4).

The results are shown in Table 2.

TABLE 2

| | Configuration | Ratio | Curvature radius | Rupture ratio (%) |
|---|---|---|---|---|
| A-1 | Circular | 1.0 | 0.01 | 100 |
| A-2 | Circular | 1.0 | 0.05 | 100 |
| A-3 | Circular | 1.0 | 0.10 | 100 |
| *A-4 | Circular | 1.0 | 0.15 | 60 |
| *A-5 | Circular | 1.0 | 0.20 | 40 |
| B-1 | Oval | 1.1 | 0.05 | 100 |
| B-2 | Oval | 1.2 | 0.05 | 100 |
| B-3 | Oval | 1.3 | 0.05 | 80 |
| B-4 | Oval | 1.4 | 0.05 | 70 |
| C-1 | Square | 1.4 | 0.05 | 70 |
| D-1 | Hexagonal | 1.1 | 0.05 | 100 |
| D-2 | Hexagonal | 1.2 | 0.05 | 100 |
| D-3 | Hexagonal | 1.3 | 0.05 | 80 |
| D-4 | Hexagonal | 1.4 | 0.05 | 80 |

The symbol * indicates that the safety device samples fall out of the scope of the invention.

The symbol * indicates that the safety device samples fall out of the scope of the invention.

The safety device samples A-4, A-5 in which the curvature radius R of the corner of the juncture between the spacer plate 7 and the thin plate 5 was greater than 0.1 mm were fabricated by the press molding method, and had lower levels of rupture ratio, i.e., not higher than 60%. The other safety device samples which were fabricated by the green sheet stacking method each had a radius of curvature R of not greater than 0.1 mm with a higher rupture ratio, i.e., not lower than 70%.

Therefore, the radius of curvature of the juncture corner of the safety device should be 0.1 mm or smaller, preferably as small as possible. It is also understood that the safety device fabrication process using green sheets is more advantageous.

As for the plan configuration of the reference pressure chamber 6, a major- to minor-axis length ratio of not higher than 1.2 (samples A-1 to A-3, B-1, B-2, and D-1 to D-2) provided for a rupture ratio of 100%. Even where the reference pressure chamber had any other configuration, the rupture ratio was not influenced by the configuration, as long as the major- to minor-axis length ratio of the juncture corner is within the aforesaid range.

Next, an explanation will be given to the results of a test for examination of a relationship between the characteristics of the material and the rupture ratio.

Safety device samples having substantially the same construction as the safety device 133 were each fabricated in substantially the same manner as described above by stacking green sheets composed of a powdery ceramic material (alumina or zirconia), a glass material or a glass ceramic material as shown by A to F in Table 3. The sintering temperature was properly selected depending on the type of the material.

TABLE 3

| | Characteristics of material | |
|---|---|---|
| Material | Young's modulus (GPa) | Flexural strength (MPa) |
| A Alumina | 325 | 300 |
| B Zirconia | 180 | 1000 |
| C Zirconia | 200 | 1500 |

TABLE 3-continued

| | Characteristics of material | |
|---|---|---|
| Material | Young's modulus (GPa) | Flexural strength (MPa) |
| D Glass ceramic | 100 | 200 |
| E Glass | 58 | 70 |
| F Crystallized Glass | 100 | 240 |

The safety device samples were each constructed such that: the thin plate 5 thereof had a thickness of 8 to 150 μm; the reference pressure chamber 6 was of a circular configuration having a diameter of 3 mm and a major- to minor-axis length ratio of 1.0; and the through-hole 9a communicating with the reference pressure chamber 6 had a diameter of 0.3 mm and was closed with a resin.

The safety device samples thus fabricated were put in a pressure vessel, and the inside pressure of the vessel was gradually increased to a maximum pressure of 7 kg/cm$^2$ for determination of the thin plate rupture ratio. The maximum pressure was set to a level corresponding to an inside pressure level of a secondary battery which was considered to be abnormal.

The results are shown in Table 4.

TABLE 4

| | Thickness of thin plate (μm) | Rupture ratio (%) |
|---|---|---|
| A-1 | 8 | 40 |
| A-2 | 10 | 100 |
| A-3 | 25 | 100 |
| A-4 | 50 | 100 |
| A-5 | 75 | 100 |
| A-6 | 100 | 100 |
| A-7 | 125 | 50 |
| A-8 | 150 | 10 |
| B-1 | 8 | 20 |
| B-2 | 10 | 80 |
| B-3 | 25 | 100 |
| B-4 | 50 | 100 |
| B-5 | 75 | 60 |
| B-6 | 100 | 0 |
| C-1 | 8 | 0 |
| C-2 | 10 | 0 |
| C-3 | 25 | 0 |
| C-4 | 50 | 0 |
| C-5 | 75 | 0 |
| C-6 | 100 | 0 |
| D-1 | 8 | 0 |
| D-2 | 10 | 80 |
| D-3 | 25 | 100 |
| D-4 | 50 | 100 |
| D-5 | 75 | 100 |
| D-6 | 100 | 100 |
| D-7 | 125 | 50 |
| D-8 | 150 | 10 |
| E-1 | 8 | — |
| E-2 | 10 | — |
| E-3 | 25 | 10 |
| E-4 | 50 | 50 |
| E-5 | 75 | 50 |
| E-6 | 100 | 40 |
| E-7 | 125 | 30 |
| E-8 | 150 | 10 |
| E-9 | 170 | 0 |
| F-1 | 8 | 0 |
| F-2 | 10 | 80 |
| F-3 | 25 | 100 |
| F-4 | 50 | 100 |

TABLE 4-continued

| | Thickness of thin plate (μm) | Rupture ratio (%) |
|---|---|---|
| F-5 | 75 | 100 |
| F-6 | 100 | 100 |
| F-7 | 125 | 60 |

"—" indicates that the thin plate was ruptured in handling thereof.

In the case of the samples E-1 to E-9 in which the material had a Young's modulus of lower than 60 GPa and a flexural strength of lower than 80 MPa, a smaller thickness of the thin plate resulted in unstable production because of breakage of the thin plate in handling thereof, and a greater thickness of the thin plate resulted in unstable rupture characteristics of the thin plate with a lower rupture ratio. This is because the thin plate composed of the material having a lower Young's modulus was liable to be deformed by application of pressure, so that it was difficult to assuredly cause the rupture of the thin plate.

In the case of the samples C-1 to C-6 in which the material had a flexural strength of greater than 1000 MPa, rupture of the thin plate did not occur because the strength thereof was too high.

Therefore, it is desirable that the material for the thin plate 5 has a Young's modulus of not lower than 60 GPa and a flexural strength of 80 to 1000 MPa. This is applicable to the thin plate 20 and the thin plate portions 20A and 20B according to the first to third embodiments.

In the case of the samples A-1, B-1, C-1, D-1, E-1 and F-1 in which the thin plate 5 had a thickness of smaller than 10 μm, the thin plate was liable to have minute defects therein because of its smaller thickness. Accordingly, there was air communication between the inside and outside of the reference pressure chamber 6, making it impossible to rupture the thin plate 5 or resulting in a lower rupture ratio. On the other hand, a greater thickness of the thin plate resulted in a lower rupture rate because a higher pressure was required for the rupture of the thin plate.

In view of the breakage of the thin plate during the handling thereof and the rupture ratio, it is preferred that the thickness of the thin plate 5 is 10 to 100 μm. This is applicable to the thin plate 20 of the first embodiment. It is more preferred that the thickness of the thin plate 5 for the safety device is 25 to 75 μm. This is applicable to the thin plate and the thin plate portions 20A and 20B according to the first to third embodiments.

An operation test was performed in which safety devices having the same construction as the safety device 133 of the third embodiment were employed as safeguards for rechargeable secondary batteries for evaluation thereof. As a result, 100% rupture of the thin plates at a pressure of 7 kg/cm$^2$ was observed, so that the requirement for the rupture pressure was satisfied. It was also confirmed that the conductive portions 10 were assuredly cut off.

While several embodiments of the present invention have thus been described, the invention is not limited thereto. For example, the thin plates 20, 5 and the substrate 60 may be composed of any brittle material selected from ceramic materials such as alumina-, zirconia- and titania-based ceramic materials, forsterite, steatite and cordierite, various glass materials, and glass-ceramic composite materials. Further, the conductive paths 30, 10 may be composed of any metal selected from Cu, Ni, Al, Au, Ag and stainless steel or an alloy of any of these metals.

Although a single safety device is incorporated in the casing of the secondary battery in the embodiments described above, two or more safety devices may be connected in series and interposed between the internal and external electrodes. In such a case, effectuation of any of these safety devices interrupts the charging process of the battery. Thus, the reliability of the secondary battery can further be improved.

The safety device of the present invention can be used as an explosion-preventive safety device for preventing an explosion due to pressure buildup for use not only in the secondary battery but also in any of various apparatuses such as air compressors. That is, the safety device of the present invention is applicable to various pressure-responsive safety devices which can be effectuated at a desired pressure level by properly selecting the thickness of the thin plate.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application claims conventional priority benefits on the basis of Japanese Patent Applications No. 10-119756 and No. 10-337226 filed to the Japanese Patent Office on Apr. 28, 1998 and Nov. 27, 1998, respectively, the disclosure thereof being incorporated herein by reference.

What is claimed is:

1. A safety device, comprising:
reference pressure chamber members defining a sealed reference pressure chamber, said members including a thin plate having a peripheral portion and a remaining portion, the peripheral portion having a thickness greater than a thickness of the remaining portion, the thin plate being formed of a brittle material adapted to be ruptured by a difference between a first pressure exerted on one surface of the thin plate within the chamber and a second pressure exerted on an opposite surface of the thin plate outside the chamber; and
a conductive path provided on the thin plate and adapted to be cut off by rupture of the thin plate.

2. A safety device as set forth in claim 1, wherein the reference pressure chamber is further defined by a plate member having a cavity wherein a cover member covers the cavity, and wherein the cover member or a bottom of the cavity is comprised of the thin plate.

3. A safety device as set forth in claim 1, wherein the brittle material is selected from the group consisting of ceramic materials, glass materials and glass ceramic materials.

4. A safety device as set forth in claim 1, wherein the brittle material has a Young's modulus of not lower than 60 GPa and a flexural strength of 80 to 1000 MPa.

5. A safety device as set forth in claim 1, wherein the thin plate has a thickness of 10 to 100 μm.

6. A safety device, comprising:
reference pressure chamber members defining a sealed reference pressure chamber, said members including a thin plate, of a brittle material adapted to be ruptured by a difference between a first pressure exerted on one surface of the thin plate within the chamber and a second pressure exerted on an opposite surface of the thin plate outside the chamber; and
a conductive path provided on the thin plate and adapted to be cut off by rupture of the thin plate, wherein the reference pressure chamber members further comprise a spacer plate provided integrally with the thin plate on the one surface thereof and having a through-hole through which a portion of the one surface of the thin plate is exposed, wherein the reference pressure chamber members further include a cover plate on a side of the spacer plate opposite from the thin plate, said cover plate covering the side to further define the sealed reference pressure chamber.

7. A safety device as set forth in claim 6, wherein a juncture between the spacer plate and the thin plate has an inner corner having a radius of curvature of not greater than 0.1 mm.

8. A safety device as set forth in claim 5, wherein the reference pressure chamber has a major- to minor-axis length ratio of 1.0 to 1.2 as viewed in plan.

9. A safety device as set forth in claim 6, wherein the brittle material is selected from the group consisting of ceramic materials, glass materials and glass ceramic materials.

10. A safety device as set forth in claim 6, wherein the brittle material has a Young's modulus of not lower than 60 GPa and a flexural strength of 80 to 1000 MPa.

11. A safety device as set forth in claim 6, wherein the thin plate has a thickness of 10 to 100 $\mu$m.

12. A secondary battery, comprising:

a casing;

an electrolytic solution;

a plurality of internal electrodes immersed in the electrolytic solution within the casing;

an external electrode connected to one of the internal electrodes; and a safety device connected between the one internal electrode and the external electrode, the safety device including reference pressure chamber members defining a sealed reference pressure chamber, said members including a thin plate having one surface inside the chamber, the thin plate of a brittle material adapted to be ruptured by a difference between a first pressure within the chamber and a second pressure outside the chamber, the first and second pressures exerted on opposite surfaces of the thin plate, and a conductive path provided on the thin plate and adapted to be cut off by the rupture of the thin plate, wherein the reference pressure chamber members further include a spacer plate provided integrally with the thin plate on the one surface thereof and having a through-hole through which a portion of the one surface of the thin plate is exposed.

* * * * *